(12) United States Patent
Vendelbo

(10) Patent No.: US 12,306,927 B2
(45) Date of Patent: *May 20, 2025

(54) HEARING DEVICE SYSTEM, DEVICES AND METHOD OF CREATING A TRUSTED BOND BETWEEN A HEARING DEVICE AND A USER APPLICATION

(71) Applicant: GN Hearing A/S, Ballerup (DK)

(72) Inventor: Allan Munk Vendelbo, Ballerup (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,071

(22) Filed: Mar. 4, 2024

(65) Prior Publication Data
US 2024/0211582 A1 Jun. 27, 2024

Related U.S. Application Data

(63) Continuation of application No. 17/706,178, filed on Mar. 28, 2022, now Pat. No. 12,026,245, which is a
(Continued)

(30) Foreign Application Priority Data

Dec. 8, 2016 (EP) .................................... 16202918

(51) Int. Cl.
*G06F 21/44* (2013.01)
*H04L 9/08* (2006.01)
(Continued)

(52) U.S. Cl.
CPC ............ *G06F 21/44* (2013.01); *H04L 9/0838* (2013.01); *H04L 9/3242* (2013.01);
(Continued)

(58) Field of Classification Search
CPC ... H04L 9/0838; H04L 63/126; H04L 9/3271; G06F 21/44; H04W 12/06; H04W 12/04; H04R 2225/55; H04R 25/554
See application file for complete search history.

(56) References Cited

U.S. PATENT DOCUMENTS 9,066,327 B2 6/2015 Liu
9,232,293 B1 * 1/2016 Hanson ................. H04W 12/06
(Continued)

FOREIGN PATENT DOCUMENTS

| CN | 101764803 | 6/2010 |
|---|---|---|
| CN | 103916842 | 7/2014 |
| CN | 105577680 | 5/2016 |

OTHER PUBLICATIONS

Barker, Elaine, et al. "A framework for designing cryptographic key management systems." NIST Special Publication 800.130 (2013) (Year: 2013).*
(Continued)

*Primary Examiner* — Syed A Zaidi
(74) *Attorney, Agent, or Firm* — Vista IP Law Group, LLP

(57) ABSTRACT

Methods and devices are disclosed. A method, performed in a user application, of creating a trusted bond between a hearing device and the user application is disclosed, wherein the method comprises obtaining first authentication material; transmitting a first authentication request comprising a first authentication type identifier and first authentication data to the hearing device; receiving an authentication response comprising an authentication key identifier; storing an authentication key and the authentication key identifier, wherein the authentication key is based on the first authentication material; and connecting the user application to the hearing device using the authentication key and the authentication key identifier.

23 Claims, 9 Drawing Sheets

Related U.S. Application Data continuation of application No. 15/813,135, filed on Nov. 14, 2017, now Pat. No. 11,295,002.

(51) Int. Cl.

| | | |
|---|---|---|
| *H04L 9/32* | (2006.01) | |
| *H04L 9/40* | (2022.01) | |
| *H04R 25/00* | (2006.01) | |
| *H04W 12/0471* | (2021.01) | |
| *H04W 12/06* | (2021.01) | |
| *H04W 12/069* | (2021.01) | |

(52) U.S. Cl.
CPC .......... *H04L 9/3271* (2013.01); *H04L 63/126* (2013.01); *H04R 25/558* (2013.01); *H04W 12/0471* (2021.01); *H04W 12/068* (2021.01); *H04W 12/069* (2021.01); *H04R 25/554* (2013.01); *H04R 2225/55* (2013.01)

(56) References Cited

U.S. PATENT DOCUMENTS

| | | | |
|---|---|---|---|
| 9,344,185 B2 | 5/2016 | Lo | |
| 10,609,070 B1 | 3/2020 | Farmer, III | |
| 10,915,902 B2 | 2/2021 | Bouda | |
| 2001/0032232 A1 | 10/2001 | Zombek et al. | |
| 2002/0178354 A1 | 11/2002 | Ogg et al. | |
| 2002/0178366 A1* | 11/2002 | Ofir | G06F 21/6245 713/182 |
| 2005/0210252 A1 | 9/2005 | Freeman et al. | |
| 2009/0158039 A1 | 6/2009 | Prasad et al. | |
| 2009/0222659 A1* | 9/2009 | Miyabayashi | H04L 9/3239 713/175 |
| 2010/0022217 A1 | 1/2010 | Ketari | |
| 2010/0138652 A1 | 6/2010 | Sela et al. | |
| 2010/0262831 A1 | 10/2010 | Cheng et al. | |
| 2011/0313922 A1* | 12/2011 | Ben Ayed | H04W 4/80 705/42 |
| 2011/0319018 A1* | 12/2011 | Kroman | H04R 25/554 455/41.1 |
| 2012/0047289 A1 | 2/2012 | Krzystofczyk et al. | |
| 2013/0243195 A1 | 9/2013 | Kruegel et al. | |
| 2013/0252630 A1* | 9/2013 | Edge | H04L 12/18 455/456.1 |
| 2013/0262859 A1* | 10/2013 | Nguyen | H04L 9/321 713/155 |
| 2014/0025951 A1* | 1/2014 | Ho | H04L 9/3268 713/168 |
| 2014/0064488 A1* | 3/2014 | Ho | H04W 12/50 380/270 |
| 2014/0108804 A1 | 4/2014 | Kanungo et al. | |
| 2014/0136847 A1 | 5/2014 | Huang | |
| 2014/0258132 A1* | 9/2014 | Swamy | G06Q 20/3278 705/67 |
| 2014/0341405 A1 | 11/2014 | Pedersen et al. | |
| 2015/0067328 A1 | 3/2015 | Yin | |
| 2015/0102927 A1 | 4/2015 | Johnson et al. | |
| 2015/0351142 A1 | 12/2015 | Seymour et al. | |
| 2016/0150352 A1* | 5/2016 | Saed | H04W 12/50 455/41.2 |
| 2016/0192277 A1 | 6/2016 | Starsinic | |
| 2016/0337863 A1 | 11/2016 | Robinson et al. | |
| 2017/0078283 A1 | 3/2017 | Unagami et al. | |
| 2017/0257472 A1 | 9/2017 | Gehring et al. | |

OTHER PUBLICATIONS

NPL Search Terms (Year: 2024).*
Final Office Action for U.S. Appl. No. 17/706,178 dated Dec. 19, 2023.
Non-Final Office Action for U.S. Appl. No. 17/706,178 dated Aug. 16, 2023.
Notice of Allowance for U.S. Appl. No. 17/706,178 dated Feb. 28, 2024.
Barker, Elaine, et al. "A framework for designing cryptographic key management systems." N 1st Special Publication 800.130 (2013): 1-112. (Year: 2013).
Final Office Action for U.S. Appl. No. 15/813,135 dated Apr. 27, 2021.
Final Office Action for U.S. Appl. No. 15/813,135 dated Jun. 26, 2020.
Non-Final Office Action for U.S. Appl. No. 15/813,135 dated Dec. 7, 2020.
Non-Final Office Action for U.S. Appl. No. 15/813,135 dated Dec. 18, 2019.
Notice of Allowance for U.S. Appl. No. 15/813,135 dated Nov. 24, 2021.
Notice of Allowance for U.S. Appl. No. 15/813,135 dated Sep. 20, 2021.
Notice of Allowance for U.S. Appl. No. 15/813,135 dated Jul. 14, 2021.
English translation of foreign office action dated Oct. 9, 2021 for Chinese Patent Application No. 201711292166.5.
Foreign OA for CN Patent Appln. No. 201711292166.5 dated Oct. 9, 2021.
Xu, Junfeng, et al. "Pairing and authentication security technologies in low-power Bluetooth." 2013 IEEE international conference on green computing and communications and IEEE internet of things and IEEE cyber, physical and social computing. IEEE, 2013. (Year: 2013).
NPL Search Terms (Year: 2021).
European Search Report for EP Patent Appln. No. 21164075.0 dated Jun. 30, 2021.
EPO Communication for EP Patent Appln. No. 16202918.5 dated Oct. 11, 2019.
"Bluetooth Low Energy Design 1 01: From Chipsets to Protocol Stacks to Modules", Jul. 14, 2016 (Jul. 14, 2016), pp. 1-6, XP055628984, Retrieved from the Internet: URL: https//lwww.digikey.com/en/articles/techzone/2016/jul/bluetooth-lowenergy-design-101-from-chipsets-to-protocol-stacks-to-modules.
Extended European Search Report dated Jun. 8, 2017 for related EP Appln. No. 16202918.5.
Barker, Elaine, et al. "A framework for designing cryptographic key management systems." NIST Special Publication 800.130 (2013): 1-112.
Bluetooth, S. I. G. "Specification of the Bluetooth system—wireless connections made easy, Bluetooth Core Specification v1.1, 2001."
"Part H—Security Manager Specification" In: "Core System Package [Host volume]", Dec. 2, 2014 (Dec. 2, 2014), Bluetooth SIG, www.bluetooth.org/docman/handlers/downloaddoc.ashx?doc_id=441541, XP055629003, vol. 3, pp. 586-702.
NPL Search Results (Year: 2019).
NPL Search Terms (Year: 2020).

* cited by examiner

HEARING DEVICE SYSTEM, DEVICES AND METHOD OF CREATING A TRUSTED BOND BETWEEN A HEARING DEVICE AND A USER APPLICATION

RELATED APPLICATION DATA

This application is a continuation of U.S. patent application Ser. No. 17/706,178 filed on Mar. 28, 2022, pending, which is a continuation of U.S. patent application Ser. No. 15/813,135 filed on Nov. 14, 2017, now U.S. Pat. No. 11,295,002, which claims priority to, and the benefit of, European Patent Application No. 16202918.5, filed on Dec. 8, 2016, pending. The entire disclosures of the above applications are expressly incorporated by reference herein.

FIELD

The present disclosure relates to a hearing device system comprising a hearing device and a user accessory device. In particular, the present disclosure relates to methods and devices for creating a trusted bond between entities of a hearing device system.

BACKGROUND

Wireless communication to and from different entities of a hearing device system has been increasing in continuation of the developments within wireless communication technology. However, the new technologies entail new challenges for the hearing aid manufacturers in order to secure communication in a hearing device system. Wireless communication interfaces of a hearing device system desirably use an open standard-based interface. However, this poses many challenges in terms of security.

SUMMARY

There is a need for apparatus, devices and methods for providing easy, efficient, and secure pairing of a user application and a hearing device.

Accordingly, a method, performed in a user application, of creating a trusted bond between a hearing device and the user application is disclosed, wherein the method comprises: obtaining first authentication material; transmitting a first authentication request comprising a first authentication type identifier and/or first authentication data to the hearing device; receiving an authentication response comprising an authentication key identifier; storing an authentication key and the authentication key identifier, wherein the authentication key is optionally based on the first authentication material; and connecting the user application to the hearing device using the authentication key and the authentication key identifier.

Further, a method, performed in a hearing device, of creating a trusted bond between the hearing device and a user application is disclosed, wherein the method comprises: optionally transmitting security data of the hearing device, wherein the security data are indicative of an authentication type applied in the hearing device; transmitting first authentication material; receiving a first authentication request comprising a first authentication type identifier and/or first authentication data; verifying the first authentication data; and determining and storing an authentication key if verifying the first authentication data is successful.

Also, a user application configured to perform methods performed in a user application described herein is provided.

A hearing device configured to perform methods performed in a hearing device described herein is provided.

A user application for a user accessory device of a hearing device system comprising a hearing device is provided, the user accessory device comprising a processing unit; a memory unit; and an interface, wherein the user application when running on the user accessory device is configured to: obtain first authentication material; transmit a first authentication request comprising a first authentication type identifier and/or first authentication data to the hearing device; receive an authentication response comprising an authentication key identifier; store an authentication key and the authentication key identifier, wherein the authentication key is based on the first authentication material; and connect the user application to the hearing device using the authentication key and the authentication key identifier.

Even further, a hearing device is provided, the hearing device comprising: a processing unit; a memory unit; and an interface, wherein the hearing device is configured to: transmit first authentication material; receive a first authentication request comprising a first authentication type identifier and/or first authentication data; verify the first authentication data; and determine and store an authentication key if verifying the first authentication data is successful.

It is an important advantage of the present disclosure that a secure and easy pairing between a user application and a hearing device is provided, at least after an initial pairing. Further, the present disclosure allows for a plurality of ways to authenticate a user application towards a hearing device, in turn providing increased design freedom for a dispenser.

The present methods, applications and devices enables a dispenser, the hearing device manufacturer and even the hearing device user to select a suitable initial method of pairing or creating a trusted bond from a plurality of ways to creating a trusted bond between a hearing device and a user application.

It is an important advantage that the authentication key is not transmitted between the user application and the hearing device, which increases the security level in hearing device system communication.

A method of establishing a connection with a hearing device, includes: obtaining first authentication material; transmitting a first authentication request comprising a first authentication type identifier and first authentication data to the hearing device; receiving an authentication response comprising an authentication key identifier; storing an authentication key and the authentication key identifier, wherein the authentication key is based on the first authentication material; and establishing a connection with the hearing device using the authentication key and the authentication key identifier.

Optionally, the first authentication material comprises a hearing device identifier and a first hearing device challenge value.

Optionally, the method further includes determining a first common secret based on the first authentication material.

Optionally, the method further includes determining an application session key, and calculating the first authentication data based on the application session key.

Optionally, the method further includes verifying the authentication response; wherein the act of storing the authentication key and the authentication key identifier and/or the act of establishing the connection with the hearing device using the authentication key and the authentication key identifier, is performed if the act of verifying the authentication response results in a successful verification.

Optionally, the method further includes calculating the authentication key based on the first authentication material.

Optionally, the method further includes obtaining security data from the hearing device, and wherein the first authentication type identifier is based on the security data.

Optionally, if the security data is indicative of a primary authentication type, the method further comprises: receiving an authentication accept message; obtaining second authentication material comprising a hearing device challenge value; determining second authentication data based on the second authentication material; and transmitting a second authentication request comprising a second authentication type identifier and the second authentication data to the hearing device.

Optionally, if the security data is indicative of a secondary authentication type, the method further comprises obtaining a passcode, and creating the first authentication request based on the passcode.

Optionally, the method further includes obtaining a public key of the hearing device, and wherein the authentication key is based on the public key of the hearing device.

A method performed by a hearing device includes: transmitting security data of the hearing device, wherein the security data is indicative of an authentication type applied in the hearing device; transmitting first authentication material; receiving a first authentication request comprising a first authentication type identifier and first authentication data; verifying the first authentication data; and determining and storing an authentication key if the first authentication data is successfully verified.

Optionally, if the security data is indicative of a primary authentication type and if the first authentication data is successfully verified, the method further comprises: transmitting an authentication accept message; transmitting second authentication material comprising a second hearing device challenge value; receiving a second authentication request comprising a second authentication type identifier and second authentication data; verifying the second authentication data; and transmitting an authentication response comprising an authentication key identifier indicative of the authentication key in the hearing device if the second authentication data is successfully verified.

Optionally, the method further includes: starting a timer if the first authentication data is successfully verified; and deleting or overwriting the authentication key if the timer reaches a timer threshold.

Optionally, if the security data is indicative of a secondary authentication type, the method further comprises: retrieving a passcode; wherein the first authentication data is verified based on the passcode.

A program product includes a set of instructions, an execution of which by a processing unit of a user accessory device will cause the user accessory device to perform a method, the method comprising: obtaining first authentication material; transmitting a first authentication request comprising a first authentication type identifier and first authentication data to a hearing device; receiving an authentication response comprising an authentication key identifier; storing an authentication key and the authentication key identifier, wherein the authentication key is based on the first authentication material; and establishing a connection with the hearing device using the authentication key and the authentication key identifier.

A hearing device includes: a processing unit; and a memory unit coupled to the processing unit; wherein the processing unit of the hearing device is configured to: transmit first authentication material; receive a first authentication request comprising a first authentication type identifier and first authentication data; verify the first authentication data; and determine and store an authentication key if the first authentication data is successfully verified.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
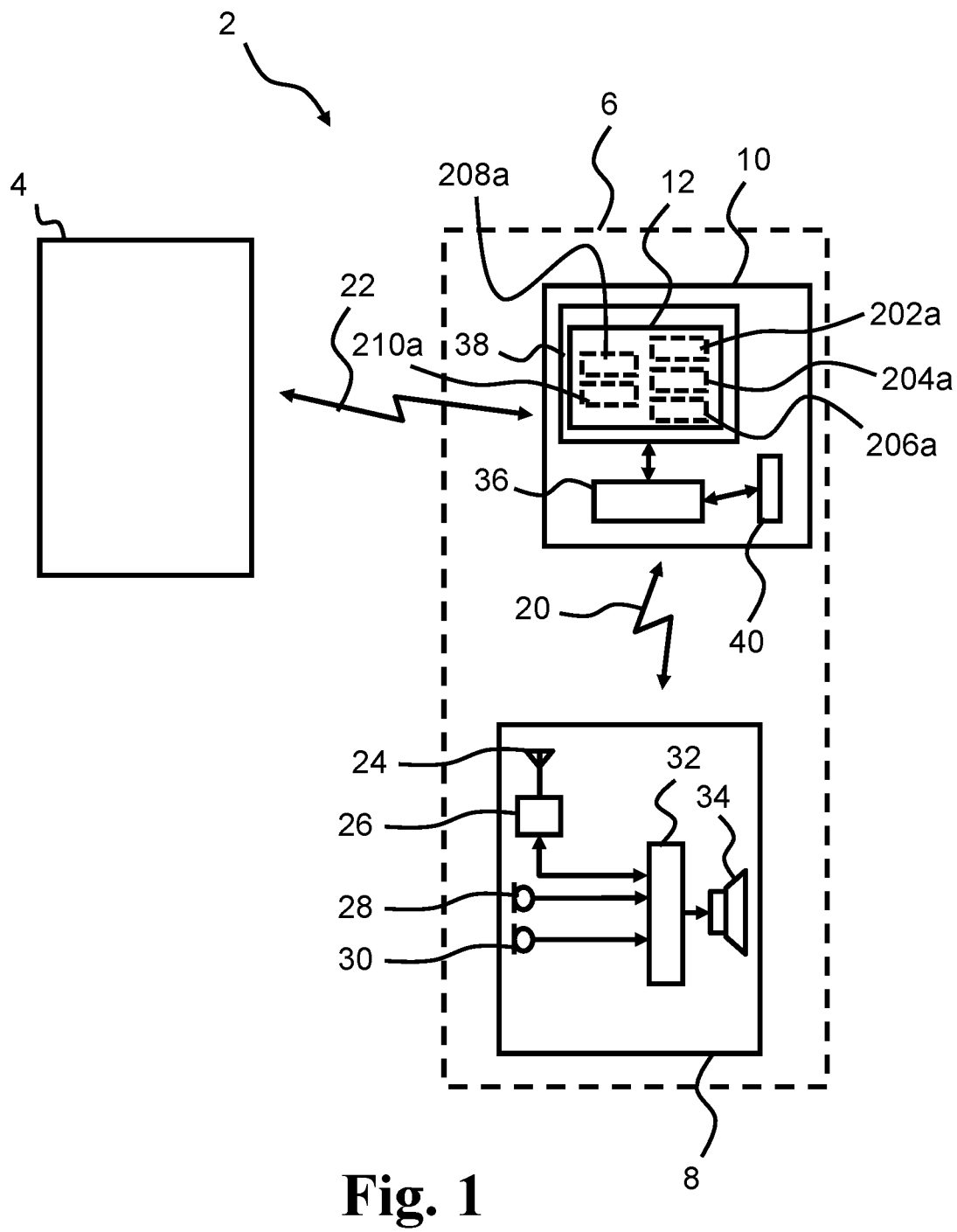
FIG. 1 schematically illustrates a hearing system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure relates to improved security in hearing system communication, and in particular for communication between a user accessory device having a user application installed thereon and a hearing device. The present disclosure relates to effective hearing system communication that is robust against replay attacks, unauthorized access, battery exhaustion attacks, and man-in-the-middle attacks.

The present method is intended for use in an initial authentication when a user application for the first time wants to create a connection to a hearing device. It is an important advantage that subsequent pairing is secure and efficient, e.g. can be performed without user interaction.

As used herein the term "identifier" refers to a piece of data that is used for identifying, such as for categorizing, and/or uniquely identifying. The identifier may be in a form of a word, a number, a letter, a symbol, a list, an array, or any combination thereof. For example, the identifier as a number may be in the form of an integer, such as unsigned integer, unit, with a length of e.g. 8 bits, 16 bits, 32 bits, or more, such as an array of unsigned integers. An identifier may have a length of several bytes. For example, a hearing device identifier may have a length of 20 bytes.

As used herein static string may be a string of characters, such as from 4 to 16 characters.

The hashing function HASH used herein may be any suitable hashing function, such as SHA-1, SHA-2, SHA-3, MD5 or other hashing functions.

The user accessory device comprises a memory unit and an interface respectively connected to a processing unit. The memory unit may include removable and non-removable data storage units including, but not limited to, Read Only Memory (ROM), Random Access Memory (RAM), etc. The memory unit has a user application stored thereon. The interface comprises an antenna and a wireless transceiver, e.g. configured for wireless communication at frequencies in the range from 2.4 to 2.5 GHz. The interface may be configured for communication, such as wireless communication, with the hearing device comprising an antenna and a wireless transceiver.

The present disclosure relates to easy and secure pairing between a user accessory device and a hearing device. The user accessory device forms an accessory device to the hearing device. The hearing device may be a hearing aid, e.g. of the behind-the-ear (BTE) type, in-the-ear (ITE) type, in-the-canal (ITC) type, receiver-in-canal (RIC) type or receiver-in-the-ear (RITE) type. Typically, the hearing device and the user accessory device is in possession of and controlled by the hearing device user.

The methods and devices create a trusted bond between a hearing device and the user application, thus reducing the complexity of subsequent authentication procedure between the user application and the hearing device.

The method performed in a user application comprises obtaining first authentication material. In one or more exemplary methods, obtaining first authentication material may comprise receiving first authentication material from a hearing device, e.g. in response to the user application transmitting a read message to the hearing device. The first authentication material may comprise a hearing device identifier and/or a first hearing device challenge value.

The method performed in a user application may comprise determining the first authentication data based on the first authentication material. The method performed in a user application may comprise determining a first common secret based on the first authentication material. The first common secret may be based on application key material. The first authentication data may be based on the first common secret.

The method performed in a user application comprises transmitting a first authentication request comprising a first authentication type identifier and/or first authentication data to the hearing device. The first authentication type identifier is indicative of the type of authentication used in the present authentication. Use of a first authentication type identifier facilitates the use of different initial authentication schemes, e.g. as determined by the hearing device.

The method performed in a user application comprises receiving an authentication response comprising an authentication key identifier. The authentication response may comprise hearing device authentication data. The authentication response may comprise an authentication status identifier indicative of the authentication status. The method performed in a user application may comprise verifying the authentication response, e.g. by verifying the hearing device authentication data and/or the authentication status identifier. Verifying the hearing device authentication data may comprise determining a hearing device session key, e.g. based on the first common secret and/or a static string, and verifying the hearing device authentication data based on the hearing device session key.

The hearing device session key HD_SK may be given as:

$$HD\_SK = HASH(CS\_1, HD\_SK\_STRING),$$

wherein HASH is a hashing function, CS_1 is the first common secret and HD_SK_STRING is a static string.

The method performed in a user application comprises storing an authentication key and the authentication key identifier, wherein the authentication key is based on the first authentication material, optionally if verifying the hearing device authentication data is successful.

The method performed in a user application may comprise verifying the authentication response. One or more of the acts of storing authentication key and authentication key identifier and/or connecting the user application to the hearing device using the authentication key and the authentication key identifier may be performed if verifying the authentication response is successful.

Also, the method performed in a user application comprises connecting the user application to the hearing device using the authentication key and the authentication key identifier, optionally if verifying the hearing device authentication data/authentication response is successful. Connecting the user application to the hearing device may comprise transmitting a first authentication request comprising the authentication key identifier, first authentication data based on the stored authentication key as keying material stored in the user application, and optionally a first authentication type identifier indicative of a tertiary authentication type.

The first authentication data may be based on the first common secret. The method performed in a user application may comprise, e.g. as part of determining the first authentication data, determining an application session key, e.g. based on the first common secret and/or a static string, and calculating the first authentication data based on the application session key.

The first common secret CS_1 may, e.g. if first authentication type identifier is indicative of primary authentication type, be given as:

$$CS\_1 = HASH(HD\_KEY, HD\_CHALLENGE\_1),$$

wherein HASH is a hashing function, HD_KEY is a hearing device key, e.g. based on the hearing device identifier, and HD_CHALLENGE_1 is the first hearing device challenge value.

The hearing device key HD_KEY may be given as:

$$HD\_KEY = HASH(HD\_ID, APP\_KEY),$$

wherein HASH is a hashing function, HD_ID is the hearing device identifier, and APP_KEY is keying material stored in the user application. The hearing device key is also found or stored in the hearing device, thus enabling the hearing device to calculate the first common secret.

The application session key APP_SK may be given as:

$$APP\_SK = HASH(CS\_1, APP\_SK\_STRING),$$

wherein HASH is a hashing function, CS_1 is the first common secret and APP_SK_STRING is a static string.

APP_SK_STRING may be different from or the same as HD_SK_STRING. Thus, application session key and hearing device session key may be the same or different keys.

The first authentication data AD_1 may be given as:

$$AD\_1 = AES\_COUNTER(APP\_SK, APP\_S\_STRING),$$

wherein AES_COUNTER is encryption with AES in counter mode, APP_SK is the application session key and APP_S_STRING is a static string. Thus, the first authentication data may be generated by encrypting a static string with the application session key based on the first common secret.

The first authentication data AD_1 may be generated by applying a hashing function to the application session key and/or a static string.

The method performed in a user application may comprise determining or calculating the authentication key based on the first authentication material. The authentication key may be based on the first common secret.

The authentication key AUTH_KEY may be given as:

$$AUTH\_KEY = HASH(CS\_1, AUTH\_KEY\_STRING),$$

wherein HASH is a hashing function, CS_1 is the first common secret and AUTH_KEY_STRING is a static string.

The method performed in a user application may comprise obtaining security data from the hearing device. The first authentication type identifier may be based on the security data. Thereby is allowed a user application and a hearing device to apply different types of authentication, e.g. as selected during fitting of the hearing device. The security data from the hearing device may comprise a type identifier indicative of the authentication to be applied in the user application/accepted by the hearing device. The security data may comprise a keying material identifier enabling the user application to verify if the user application supports communication to the hearing device.

The security data may be indicative of a primary authentication type. The method performed in a user application may comprise optionally receiving an authentication accept message; obtaining second authentication material, e.g. comprising a second hearing device challenge value and/or the hearing device identifier, optionally in response to receiving the authentication accept message; determining second authentication data based on the second authentication material; and transmitting a second authentication request comprising a second authentication type identifier and/or the second authentication data to the hearing device, optionally if the security data are indicative of a primary authentication type. The method performed in a user application may, optionally if the security data are indicative of a primary authentication type, comprise performing a primary authentication scheme.

The second authentication data may be based on a second common secret. The method performed in a user application may comprise, e.g. as part of determining the second authentication data, determining a secondary application session key, e.g. based on the second common secret and/or a static string, and calculating the second authentication data based on the application session key.

The second authentication data AD_2 may be given as:

$$AD\_2 = AES\_COUNTER(APP\_SK\_2, APP\_S\_STRING),$$

wherein AES_COUNTER is encryption with AES in counter mode, APP_SK_2 is a secondary application session key and APP_S_STRING is a static string. Thus, the second authentication data may be generated by an encrypting a static string with a secondary application session key, e.g. based on a second common secret.

The second authentication data AD_2 may be generated by applying a hashing function to the secondary application session key and/or a static string.

The second common secret CS_2 may be given as:

$$CS\_2 = HASH(HD\_KEY, HD\_CHALLENGE\_2),$$

wherein HASH is a hashing function, HD_KEY is the hearing device key, e.g. based on the hearing device identifier, and HD_CHALLENGE_2 is the second hearing device challenge value.

The secondary application session key APP_SK_2 may be given as:

$$APP\_SK\_2 = HASH(CS\_2, APP\_SK\_STRING),$$

wherein HASH is a hashing function, CS_2 is the second common secret and APP_SK_STRING is a static string.

Verifying the hearing device authentication data may comprise determining a secondary hearing device session key, e.g. based on the second common secret and/or a static string, and verifying the hearing device authentication data based on the secondary hearing device session key.

A secondary hearing device session key HD_SK_2 may be given as:

$$HD\_SK\_2 = HASH(CS\_2, HD\_SK\_STRING),$$

wherein HASH is a hashing function, CS_2 is the second common secret and HD_SK_STRING is a static string.

The security data may be indicative of a secondary authentication type. The method performed in a user application may, optionally if the security data are indicative of a secondary authentication type, comprise performing a second authentication scheme different from the first authentication scheme. The method performed in a user application may, optionally if the security data are indicative of a secondary authentication type, comprise obtaining a passcode from a user of the user application and creating the first authentication request, e.g. first authentication data, based on the passcode. Obtaining a passcode from a user of the user application may comprise receiving the passcode via a user interface of a user accessory device running the user application. The authentication key may be based on the passcode.

The first common secret CS_1 may, e.g. if first authentication type identifier is indicative of secondary authentication type, be given as:

$$CS\_1 = HASH(HASH(HD\_KEY, HD\_CHALLENGE\_1), PASSCODE\_INFO),$$

wherein HASH is a hashing function, HD_KEY is a hearing device key, e.g. based on the hearing device identifier, HD_CHALLENGE_1 is the first hearing device challenge value, and PASSCODE_INFO is based on the passcode entered by the user. The passcode info PASSCODE_INFO may be given as:

$$PASSCODE\_INFO = HASH(HD\_ID, PASSCODE\_STR),$$

wherein HASH is a hashing function, HD_ID is the hearing device identifier, and PASSCODE_STR is a string of characters with the passcode entered by the user.

The method performed in a user application may comprise obtaining a public key of the hearing device. The authentication key and/or the first authentication data may be based on the public key of the hearing device. The first common secret may be based on the public key of the hearing device. The public key of the hearing device may be a Diffie-Hellman public key. The method performed in a user application may comprise transmitting a public key of the user application to the hearing device. The first common secret may be based on the public key of the hearing device and the public key of the user application. Basing the first authentication data on public keys of the hearing device and the user application may protect the passcode.

The first common secret CS_1 may, e.g. if first authentication type identifier is indicative of primary authentication type, be given as:

$$CS\_1 = HASH(HASH(HD\_KEY, HD\_CHALLENGE\_1), DH\_SECRET),$$

wherein HASH is a hashing function, HD_KEY is a hearing device key, e.g. based on the hearing device identifier, HD_CHALLENGE_1 is the first hearing device challenge value, and DH_SECRET is the common secret of the Diffie-Hellman algorithm derived from the public keys of the hearing device and the user application.

The second common secret CS_2 may, e.g. if first authentication type identifier is indicative of primary authentication type, be given as:

$$CS\_2 = HASH(HASH(HD\_KEY, HD\_CHALLENGE\_2), AUTH\_KEY),$$

wherein HASH is a hashing function, HD_CHALLENGE_2 is the second hearing device challenge value, and AUTH_KEY is the authentication key stored in the temporary memory and given as:

$$AUTH\_KEY = HASH(CS\_1, AUTH\_KEY\_STRING).$$

The first common secret CS_1 may, e.g. if first authentication type identifier is indicative of secondary authentication type, be given as:

$$CS\_1 = HASH(HASH(HASH(HD\_KEY, HD\_CHALLENGE\_1),$$
$$PASSCODE\_INFO), DH\_SECRET)$$

wherein HASH is a hashing function, HD_KEY is a hearing device key, e.g. based on the hearing device identifier, HD_CHALLENGE_1 is the first hearing device challenge value, PASSCODE_INFO is based on the passcode entered by the user, and DH_SECRET is the common secret of the Diffie-Hellman algorithm derived from the public keys of the hearing device and the user application. The passcode info PASSCODE_INFO may be given as:

$$PASSCODE\_INFO = HASH(HD\_ID, PASSCODE\_STR),$$

wherein HASH is a hashing function, HD_ID is the hearing device identifier, and PASSCODE_STR is a string of characters with the passcode entered by the user.

The present disclosure also provides a method, performed in a hearing device, of creating a trusted bond between the hearing device and a user application.

The method performed in a hearing device may comprise transmitting security data of the hearing device, wherein the security data are optionally indicative of an authentication type applied in the hearing device.

The method performed in a hearing device may comprise connecting the user application to the hearing device using the authentication key and the authentication key identifier.

The method performed in a hearing device comprises transmitting first authentication material. The first authentication material may comprise a hearing device identifier and/or a first hearing device challenge value. The method performed in a hearing device may comprise retrieving the hearing device identifier from a memory unit and/or generating the first hearing device challenge value, e.g. as a random or pseudo-random value. The method performed in a hearing device may comprise storing the first hearing device challenge value in the hearing device.

The method performed in a hearing device comprises receiving a first authentication request comprising a first authentication type identifier and/or first authentication data. The first authentication type identifier is indicative of which type of authentication is being used by the user application.

The method performed in a hearing device comprises verifying the first authentication data. Verifying the first authentication data in the hearing device may be based on the first authentication material, e.g. hearing device identifier and/or first hearing device challenge value.

The method performed in a hearing device comprises determining and storing an authentication key, e.g. in a temporary memory and/or in authentication key storage in memory unit of the hearing device, if verifying the first authentication data is successful.

The security data may be indicative of a primary authentication type. The method performed in a hearing device may, if the security data is indicative of a primary authentication type and/or verifying the first authentication data is successful, comprise transmitting an authentication accept message; transmitting second authentication material comprising a second hearing device challenge value, optionally in response to receiving a read message from the user application; and receiving a second authentication request comprising a second authentication type identifier and/or second authentication data.

The method performed in a hearing device may comprise verifying the second authentication data and transmitting an authentication response comprising an authentication key identifier indicative of an authentication key in the hearing device, optionally if verifying the second authentication data is successful. Verifying the second authentication data in the hearing device may be based on the second authentication material, e.g. hearing device identifier and/or second hearing device challenge value.

The authentication response may comprise hearing device authentication data. The method performed in a hearing device may comprise determining the hearing device authentication data based on a common secret, such as first common secret and/or second common secret depending on authentication type.

The hearing device authentication data HD_AD may be given as:

$$HD\_AD = AES\_COUNTER(HD\_SK, HD\_S\_STRING),$$

wherein AES_COUNTER is encryption with AES in counter mode, HD_SK is the hearing device session key and HD_S_STRING is a static string. Thus, the hearing device authentication data may be generated by encrypting a static string with the hearing device session key based on the first common secret.

The hearing device authentication data HD_AD may be given as:

$$HD\_AD = AES\_COUNTER(HD\_SK\_2, HD\_S\_STRING),$$

wherein AES_COUNTER is encryption with AES in counter mode, HD_SK_2 is the secondary hearing device session key and HD_S_STRING is a static string. Thus, the hearing device authentication data may be generated by encrypting a static string with the secondary hearing device session key based on the second common secret.

The hearing device authentication data may be generated by applying a hashing function to the hearing device session key, the secondary hearing device session key, and/or a static string.

The method performed in a hearing device may comprise storing the authentication key in authentication key storage in memory unit of the hearing device, optionally if verifying the first or second authentication data is successful. The authentication key storage may comprise or have room for a plurality of authentication keys used by the hearing device for authenticating communication with different user applications or other entities. Each authentication key stored in the authentication key storage has a corresponding authentication key identifier.

The method performed in a hearing device may comprise starting a timer if verifying the first authentication data is successful. The method performed in a hearing device may comprise deleting or overwriting the authentication key, e.g. in the temporary memory, if the timer reaches a timer threshold. The method performed in a hearing device may comprise stopping and/or resetting the timer, optionally in response to a successful verification of the second authentication data. The method performed in a hearing device may comprise stopping and/or resetting the timer in response to receiving a read message from the user application or in response to receiving the second authentication request from the user application.

The method performed in a hearing device may comprise deleting or overwriting the authentication key, e.g. in the temporary memory, if verifying the second authentication data fails.

The security data may be indicative of a secondary authentication type. The method performed in a hearing device may, optionally if the security data are indicative of a secondary authentication type, comprise retrieving a passcode, e.g. from the memory unit of the hearing device; verifying the first authentication data based on the passcode; and transmitting an authentication response comprising an authentication key identifier indicative of an authentication key in the hearing device, if verifying the first authentication data is successful. The method performed in a hearing device may, e.g. if the security data are indicative of a secondary authentication type, comprise determining and storing the authentication key, e.g. in authentication key storage in a memory unit of the hearing device, e.g. if verifying the first authentication data is successful.

The method performed in a hearing device may comprise connecting the user application to the hearing device using the authentication key and the authentication key identifier. Connecting the user application to the hearing device may comprise receiving a first authentication request comprising the authentication key identifier and optionally a first authentication type identifier indicative of a tertiary authentication type.

Features described in relation to the method performed in a user application may also be applied in the method performed in a hearing device. In particular, calculation of common secrets for verification of authentication data are preferably performed the same way in both the hearing device and the user application.

The present disclosure also relates to a user application for a user accessory device. The user accessory device may be a smartphone, a smartwatch or a tablet computer. The user application is, when installed on the user accessory device, configured to create a trusted bond between a hearing device and the user application.

The present methods and devices enables simple and secure connections between a hearing device and a user application after an initial creation of a trusted bond as disclosed herein. Accordingly, processing-heavy authentication procedures may be avoided or at least heavily reduced after the trusted bond has been created.

Namely, the methods, user applications and hearing devices disclosed herein enable hearing system communication that is robust against security threats, vulnerabilities and attacks by implementing appropriate safeguards and countermeasures, such as security mechanisms, to protect against threats and attacks.

Throughout, the same reference numerals are used for identical or corresponding parts.

FIG. 1 shows an exemplary hearing system. The hearing system 2 comprises a server device 4 and a hearing device system 6 comprising a hearing device 8 and a user accessory device 10. The user accessory device 10 may be a smartphone configured to wirelessly communicate with the hearing device 8. A user application 12 is installed on the user accessory device 10. The user application may be for controlling the hearing device 8 and/or assisting a hearing device user. In one or more exemplary user applications, the user application 12 is configured to transfer firmware and/or hearing device settings to the hearing device. In one or more exemplary user applications, the user application 12 is configured to control operating parameters, such as volume, program, etc., of the hearing device The hearing device 8 may be configured to compensate for hearing loss of a user of the hearing device 8. The hearing device 8 is configured to configured to communicate with the user accessory device 10/user application 12, e.g.

using a wireless and/or wired first communication link 20. The first communication link 20 may be a single hop communication link or a multi-hop communication link. The first communication link 20 may be carried over a short-range communication system, such as Bluetooth, Bluetooth low energy, IEEE 802.11 and/or ZigBee.

The hearing device 8 comprises an interface including an antenna 24 and a radio transceiver 26 coupled to the antenna 24 for receiving/transmitting wireless communication including first communication link 20. The hearing device 8 comprises a set of microphones comprising a first microphone 28 and optionally a second microphone 30 for provision of respective first and second microphone input signals. The hearing device 8 may be a single-microphone hearing device. The hearing device 8 comprises a memory unit (not shown) connected to the processing unit 32. The hearing device 8 comprises a processing unit 32 connected to the transceiver 26 and microphones 28, 30 for receiving and processing input signals. The processing unit 32 is configured to compensate for a hearing loss of a user based on hearing device settings and to provide an electrical output signal based on the input signals. A receiver 34 converts the electrical output signal to an audio output signal to be directed towards an eardrum of the hearing device user.

The user accessory device 10 comprises a processing unit 36, a memory unit 38, an interface 40. The user application 12 is installed in the memory unit 38 of the user accessory device 10 and, when running on the user accessory device, configured to obtain first authentication material, e.g. with obtain module 202a; transmit a first authentication request comprising a first authentication type identifier and first authentication data to the hearing device, e.g. with transmit module 204a; receive an authentication response comprising an authentication key identifier, e.g. with receive module 206a; store an authentication key and the authentication key identifier, e.g. with storing module 208a, wherein the authentication key is based on the first authentication material; and connect the user application to the hearing device using the authentication key and the authentication key identifier, e.g. with connecting module 210a. The connecting module 210a may also be used for connecting with the server device, e.g. in via second communication link 22.

Figure 2:
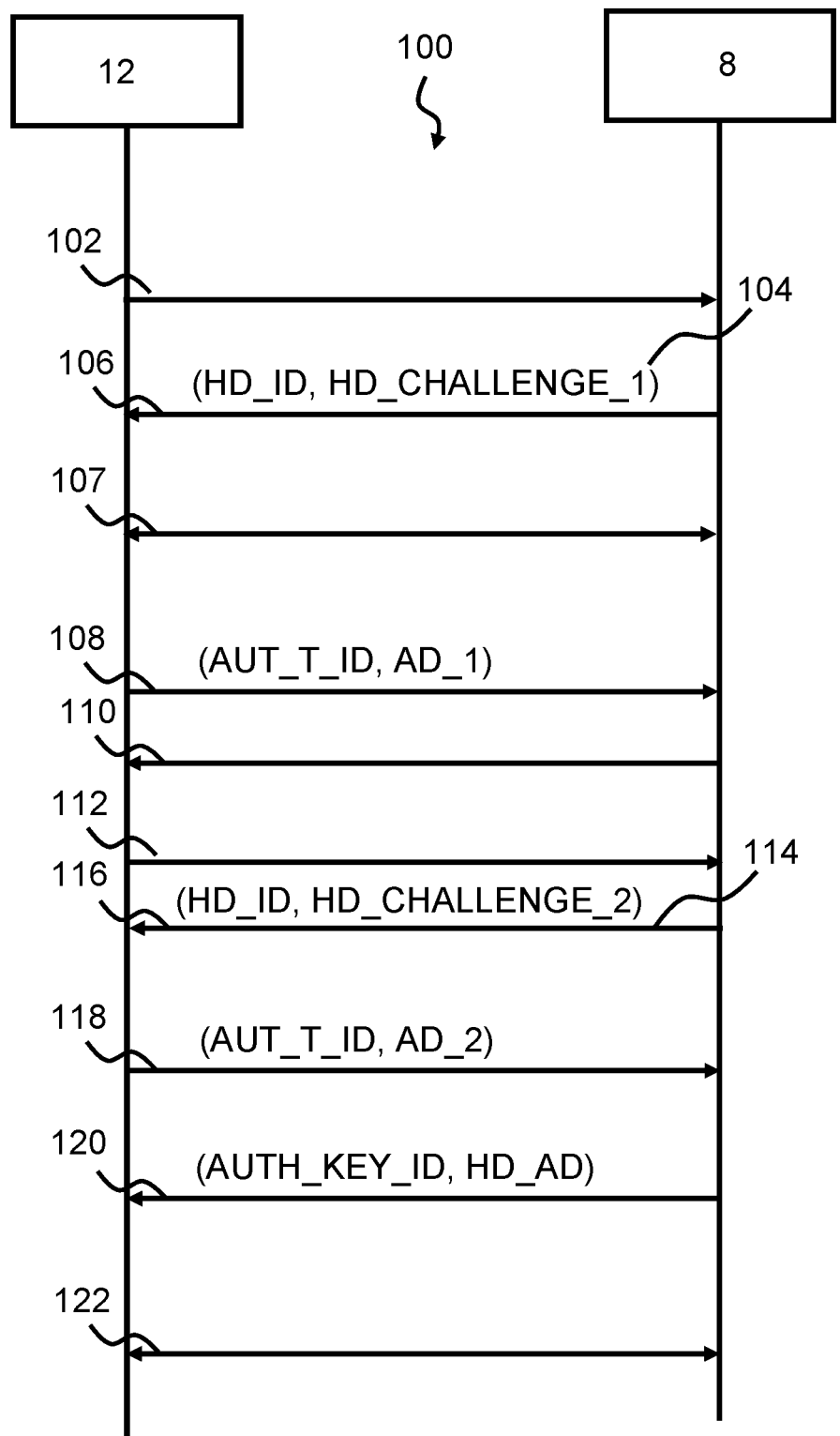
FIG. 2 shows an exemplary signaling diagram of signaling between a user application and a hearing device.

FIG. 2 shows an exemplary signaling diagram 100 between a user application 12 and a hearing device 8 illustrating exemplary methods of creating a trusted bond between a hearing device and a user application according to a primary authentication type.

The user application 12 obtains first authentication material including a hearing device identifier HD_ID and a first hearing device challenge value HD_CHALLENGE_1 by transmitting a read message 102 to the hearing device. The hearing device generates the first hearing device challenge value, stores the first hearing device challenge value in the memory unit of the hearing device, and transmits the first authentication material 104 to the user application in a read response message 106 in response to receiving the read message from the user application.

Further, the user application and the hearing device exchange public keys for the Diffie-Hellmann algorithm by key exchange signalling 107. In the primary authentication type, the key exchange signalling may be omitted.

The user application 12 determines first authentication data AD_1 and transmits a first authentication type identifier AUT_T_ID and the first authentication data AD_1 to the hearing device in a first authentication request 108. The first authentication type identifier AUT_T_ID is in first authentication request 108 indicative of a first message in a primary authentication type. The first authentication data AD_1 are given by:

$$AD\_1 = AES\_COUNTER(APP\_SK, APP\_S\_STRING),$$

wherein AES_COUNTER is encryption with AES in counter mode and APP_S_STRING is a static string.

APP_SK is an application session key and given as:

$$APP\_SK = HASH(CS\_1, APP\_SK\_STRING),$$

wherein HASH is a hashing function, such as SHA-2, and APP_SK_STRING is a static string.

CS_1 is a first common secret and is given as:

$$CS\_1 = HASH(HASH(HD\_KEY, HD\_CHALLENGE\_1), DH\_SECRET),$$

wherein HASH is a hashing function, such as SHA-2, HD_KEY is a hearing device key, HD_CHALLENGE_1 is the first hearing device challenge value, and DH_SECRET is the common secret of the Diffie-Hellman algorithm derived from the public keys of the hearing device and the user application during key exchange signalling 107. The two hashing functions used for determining CS_1 may be the same or different hashing function.

HD_KEY is a hearing device key based on the hearing device identifier and given as:

$$HD\_KEY = HASH(HD\_ID, APP\_KEY),$$

wherein HASH is a hashing function, HD_ID is the hearing device identifier, and APP_KEY is keying material stored in the user application.

The hearing device 8 receives the first authentication request 108 and verifies the first authentication data AD_1 by comparing AD_1 with authentication data calculated in the hearing device. If the hearing device 8 successfully verifies the first authentication data, and optionally the hearing device accepts the primary authentication type indicated by the first authentication type identifier, the hearing device calculates an authentication key, stores the authentication key in a temporary memory, transmits an authentication accept message 110 and starts a timer.

Assuming the hearing device is rebooted before the timer reaches a time threshold, the user application, after receipt of the authentication accept message, detects that the hearing device is visible again and transmits a read message 112 to the hearing device for obtaining second authentication material. The hearing device generates a second hearing device challenge value HD_CHALLENGE_2, stores the second hearing device challenge value in the memory unit of the hearing device, and transmits the second authentication material 114 to the user application in a read response message 116 in response to receiving the read message 112 from the user application.

Upon receipt of the read response message 116, the user application 12 determines second authentication data AD_2 and transmits a first authentication type identifier AUT_

T_ID and the second authentication data AD_2 to the hearing device in a second authentication request 118. The first authentication type identifier AUT_T_ID is in second authentication request 118 indicative of a second message in a primary authentication type. The second authentication data AD_2 are given by:

$$AD\_2 = AES\_COUNTER(APP\_SK\_2, APP\_S\_STRING),$$

wherein AES_COUNTER is encryption with AES in counter mode and APP_S_STRING is a static string.

APP_SK_2 is a secondary application session key and given as:

$$APP\_SK\_2 = HASH(CS\_2, APP\_SK\_STRING),$$

wherein HASH is a hashing function, such as SHA-2, and APP_SK_STRING is a static string.

CS_2 is a second common secret and is given as:

$$CS\_2 = HASH(HASH(HD\_KEY, HD\_CHALLENGE\_2), AUTH\_KEY),$$

wherein HASH, such as SHA-2, is a hashing function, HD_CHALLENGE_2 is the second hearing device challenge value, and AUTH_KEY is the authentication key given as:

$$AUTH\_KEY = HASH(CS\_1, AUTH\_KEY\_STRING).$$

HD_KEY is again a hearing device key based on the hearing device identifier and given as:

$$HD\_KEY = HASH(HD\_ID, APP\_KEY),$$

wherein HASH is a hashing function, such as SHA-2, HD_ID is the hearing device identifier, and APP_KEY is keying material stored in the user application. Again, the same or different hashing functions may be used in different steps for determining the secondary application session key.

The hearing device 8 receives the second authentication request 118 and verifies the second authentication request/second authentication data AD_2 by comparing AD_2 with authentication data calculated in the hearing device. If the timer has reached a timer threshold, the hearing device deletes or overwrites the authentication key, thus preventing connection using the authentication key at a later point in time.

If the hearing device 8 successfully verifies the second authentication data, the hearing device stores the authentication key from temporary memory in authentication key storage in memory unit of the hearing device with an associated authentication key identifier, determines hearing device authentication data based on the second common secret, and transmits an authentication response 120 comprising hearing device authentication data HD_AD and the authentication key identifier AUTH_KEY_ID to the user application 12.

The hearing device authentication data HD_AD is given as:

$$HD\_AD = AES\_COUNTER(HD\_SK\_2, HD\_S\_STRING),$$

wherein AES_COUNTER is encryption with AES in counter mode, HD_SK_2 is the secondary hearing device session key based on the second common secret CS_2, and HD_S_STRING is a static string.

The secondary hearing device session key HD_SK_2 is given as:

$$HD\_SK\_2 = HASH(CS\_2, HD\_SK\_STRING),$$

wherein HASH is a hashing function, such as SHA-2, CS_2 is the second common secret and HD_SK_STRING is a static string.

Thus, the hearing device authentication data may be generated by encrypting a static string with the secondary hearing device session key based on the second common secret.

The user application 12 receives the authentication response 120 and verifies the authentication response by verifying the hearing device authentication data HD_AD by comparing HD_AD with authentication data calculated in the user application based on the second common secret. If verifying the authentication response is successful, the user application calculates the authentication key AUTH_KEY (if not calculated earlier) and stores the authentication key and the authentication key identifier AUTH_KEY_ID from the authentication response and connects by connection signalling 122 to the hearing device using the authentication key AUTH_KEY and the authentication key identifier AUTH_KEY_ID.

Figure 3:
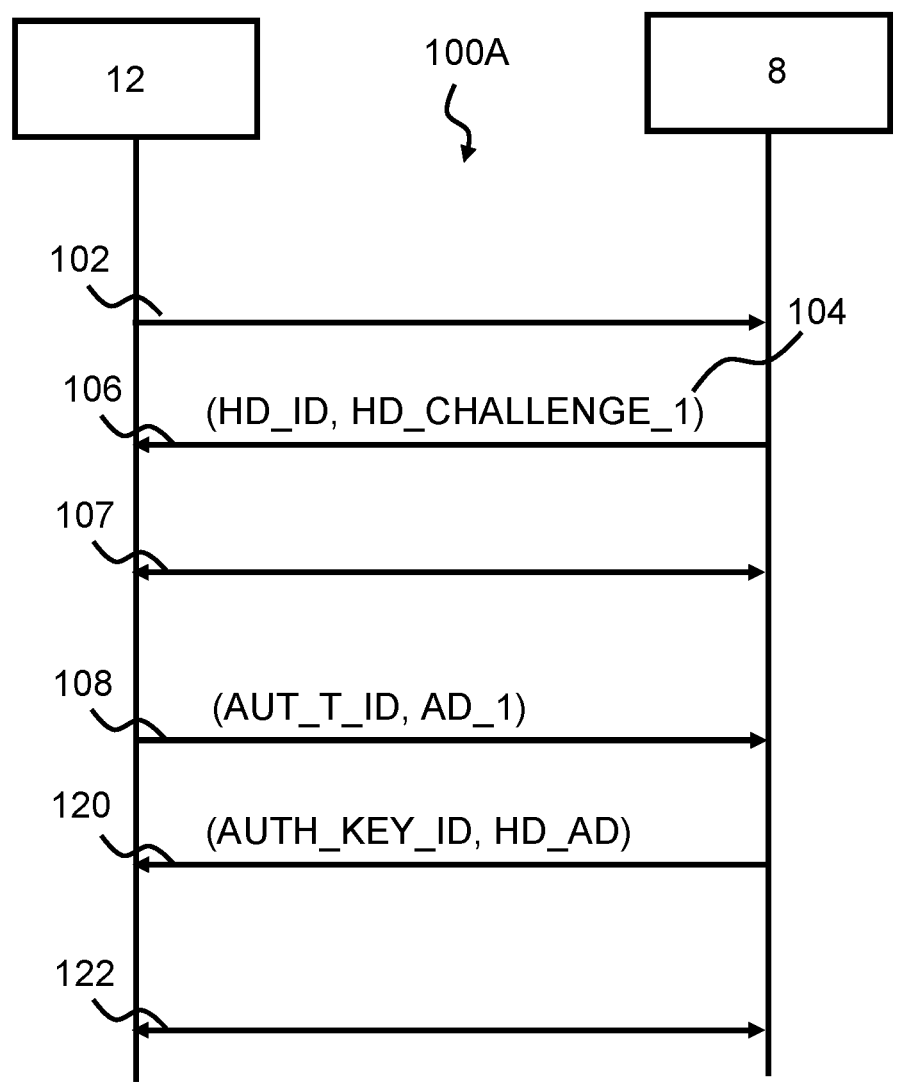
FIG. 3 shows an exemplary signaling diagram of signaling between a user application and a hearing device.

FIG. 3 shows an exemplary signaling diagram 100A between a user application 12 and a hearing device 8 illustrating exemplary methods of creating a trusted bond between a hearing device and a user application according to a secondary authentication type.

The user application 12 obtains first authentication material including a hearing device identifier HD_ID and a first hearing device challenge value HD_CHALLENGE_1 by transmitting a read message 102 to the hearing device. The hearing device generates the first hearing device challenge value, stores the first hearing device challenge value in the memory unit of the hearing device, and transmits the first authentication material 104 to the user application in a read response message 106 in response to receiving the read message from the user application.

Further, the user application and the hearing device exchange public keys for the Diffie-Hellmann algorithm by key exchange signalling 107.

The user application 12 obtains a passcode from a user of the user application by receiving the passcode via a user interface of a user accessory device running the user application and creates first authentication request 108 including first authentication data based on the passcode. The first authentication data AD_1 are given by:

$$AD\_1 = AES\_COUNTER(APP\_SK, APP\_S\_STRING),$$

wherein AES_COUNTER is encryption with AES in counter mode and APP_S_STRING is a static string.

APP_SK is an application session key and given as:

$$APP\_SK = HASH(CS\_1, APP\_SK\_STRING),$$

wherein HASH is a hashing function, such as SHA-2, and APP_SK_STRING is a static string.

CS_1 is a first common secret and is given as:

$$CS\_1 = HASH(HASH(HASH(HD\_KEY, HD\_CHALLENGE\_1),$$
$$PASSCODE\_INFO), DH\_SECRET)$$

wherein HASH is a hashing function, such as SHA-2, HD_KEY is a hearing device key based on the hearing device identifier, HD_CHALLENGE_1 is the first hearing device challenge value, PASSCODE_INFO is based on the passcode entered by the user, and DH_SECRET is the common secret of the Diffie-Hellman algorithm derived from the public keys of the hearing device and the user application. The passcode info PASSCODE_INFO is given as:

$$PASSCODE\_INFO = HASH(HD\_ID, PASSCODE\_STR),$$

wherein HASH is a hashing function, such as SHA-2, HD_ID is the hearing device identifier, and PASSCODE_STR is a string of characters with the passcode entered by the user.

HD_KEY is a hearing device key based on the hearing device identifier and given as:

$$HD\_KEY = HASH(HD\_ID, APP\_KEY),$$

wherein HASH is a hashing function, such as SHA-2, HD_ID is the hearing device identifier, and APP_KEY is keying material stored in the user application. Again, the same or different hashing functions may be used in different steps for determining the secondary application session key and/or first common secret.

The hearing device 8 receives the first authentication request 108 and verifies the first authentication data AD_1 by comparing AD_1 with authentication data calculated in the hearing device based on passcode info stored in the memory unit of the hearing device, e.g. during fitting or during hearing device update. If the hearing device 8 successfully verifies the first authentication data, and optionally the hearing device accepts the secondary authentication type indicated by the first authentication type identifier, the hearing device calculates an authentication key, stores the authentication key with an associated authentication key identifier in the memory unit, determines hearing device authentication data, and transmits an authentication response 120 comprising hearing device authentication data HD_AD and the authentication key identifier AUTH_KEY_ID to the user application 12.

The hearing device authentication data HD_AD is given as:

$$HD\_AD = AES\_COUNTER(HD\_SK, HD\_S\_STRING),$$

wherein AES_COUNTER is encryption with AES in counter mode, HD_SK is the hearing device session key based on the first common secret CS_1, and HD_S_STRING is a static string. Thus, the hearing device authentication data may be generated by encrypting a static string with the hearing device session key based on the first common secret.

The user application 12 receives the authentication response 120 and verifies the authentication response by verifying the hearing device authentication data HD_AD by comparing HD_AD with authentication data calculated in the user application based on the first common secret. If verifying the authentication response is successful, the user application calculates the authentication key AUTH_KEY (if not calculated earlier) and stores the authentication key and the authentication key identifier AUTH_KEY_ID from the authentication response and connects by connection signalling 122 to the hearing device using the authentication key AUTH_KEY and the authentication key identifier AUTH_KEY_ID.

Figure 4:
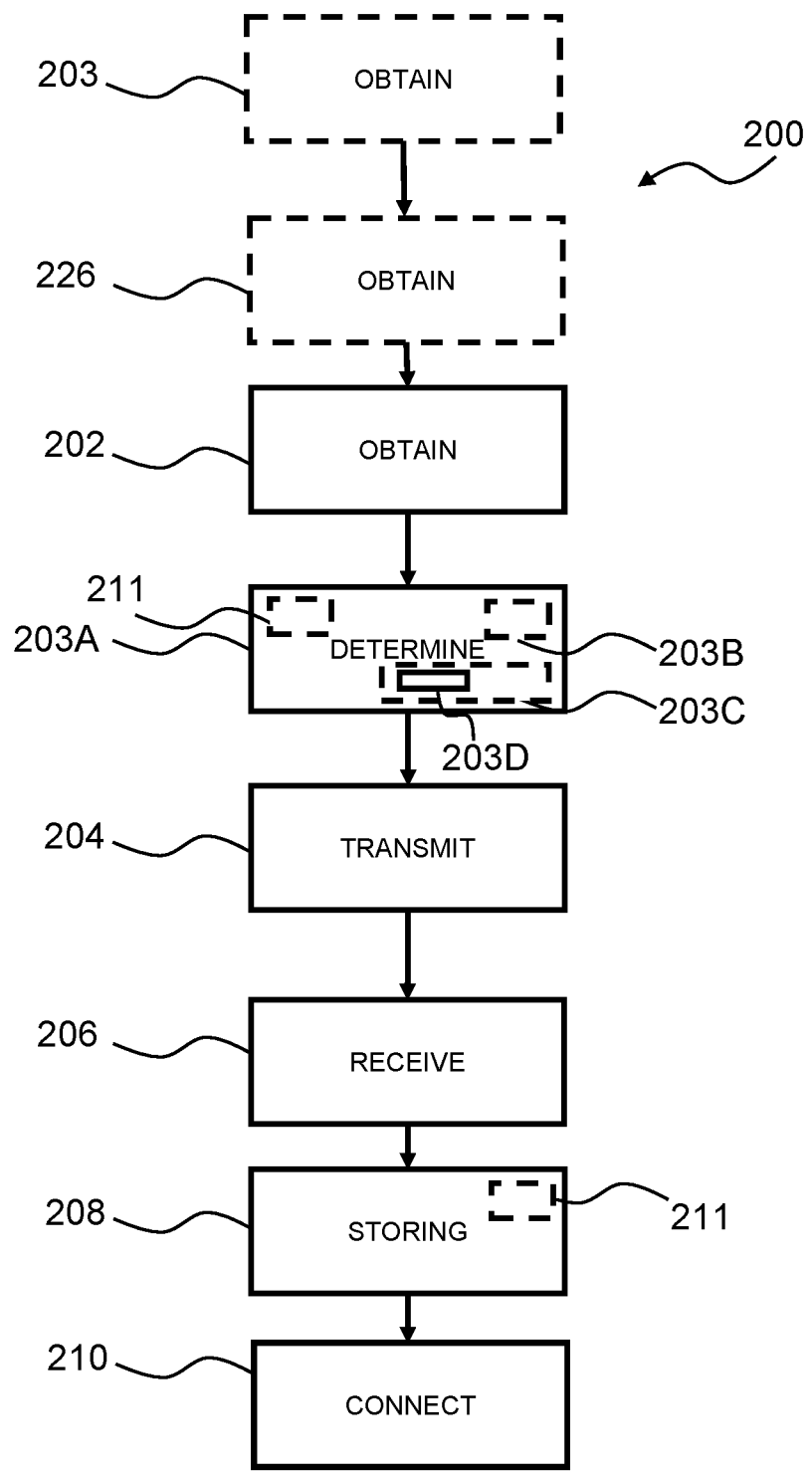
FIG. 4 is a flow diagram of an exemplary method.

FIG. 4 illustrates an exemplary method performed in a user application of creating a trusted bond between a hearing device and the user application. The method 200 comprises obtaining 202 first authentication material, e.g. with obtain module 202a, the first authentication material comprising a hearing device identifier and a first hearing device challenge value. The method 200 optionally comprises obtaining 203 security data of the hearing device. e.g. with obtain module 202a, the security data comprising a type identifier indicative of the authentication to be applied in the user application, and a keying material identifier enabling the user application to verify if the user application supports communication to the hearing device. The method 200 proceeds to determining 203A first authentication data and transmitting 204 a first authentication request comprising a first authentication type identifier and the first authentication data, e.g. with transmit module 204a, to the hearing device. Determining 203A first authentication data optionally comprises determining 203B a first common secret based on the first authentication material and optionally determining 203C the first authentication data based on the first common secret, e.g. as described in relation to FIG. 2. Determining 203A first authentication data optionally comprises determining 203D, e.g. as part of 203C, an application session key, e.g. based on the first common secret, and optionally calculating the first authentication data based on the application session key. The first authentication request comprises the first authentication type identifier based on the security data obtained in 203.

The method 200 comprises receiving 206, e.g. with receive module 206a, an authentication response comprising an authentication key identifier and storing 208 an authentication key and the authentication key identifier, e.g. with storing module 208a, wherein the authentication key is based on the first authentication material. Further, the method 200 comprises connecting 210 the user application to the hearing device, e.g. with connecting module 210a, using the authentication key and the authentication key identifier. The method 200 comprises calculating 211 the authentication key based on the first authentication material, e.g. as part of 203A or 208. The method may comprise obtaining 226 a public key of the hearing device. In one or more exemplary methods, obtaining a public key of the hearing device may be performed before or after obtaining 202 first authentication material. Determining 203A first authentication data may be based on public keys of the hearing device and the user application, e.g. using a Diffie-Helmann scheme as described earlier.

Figure 5:
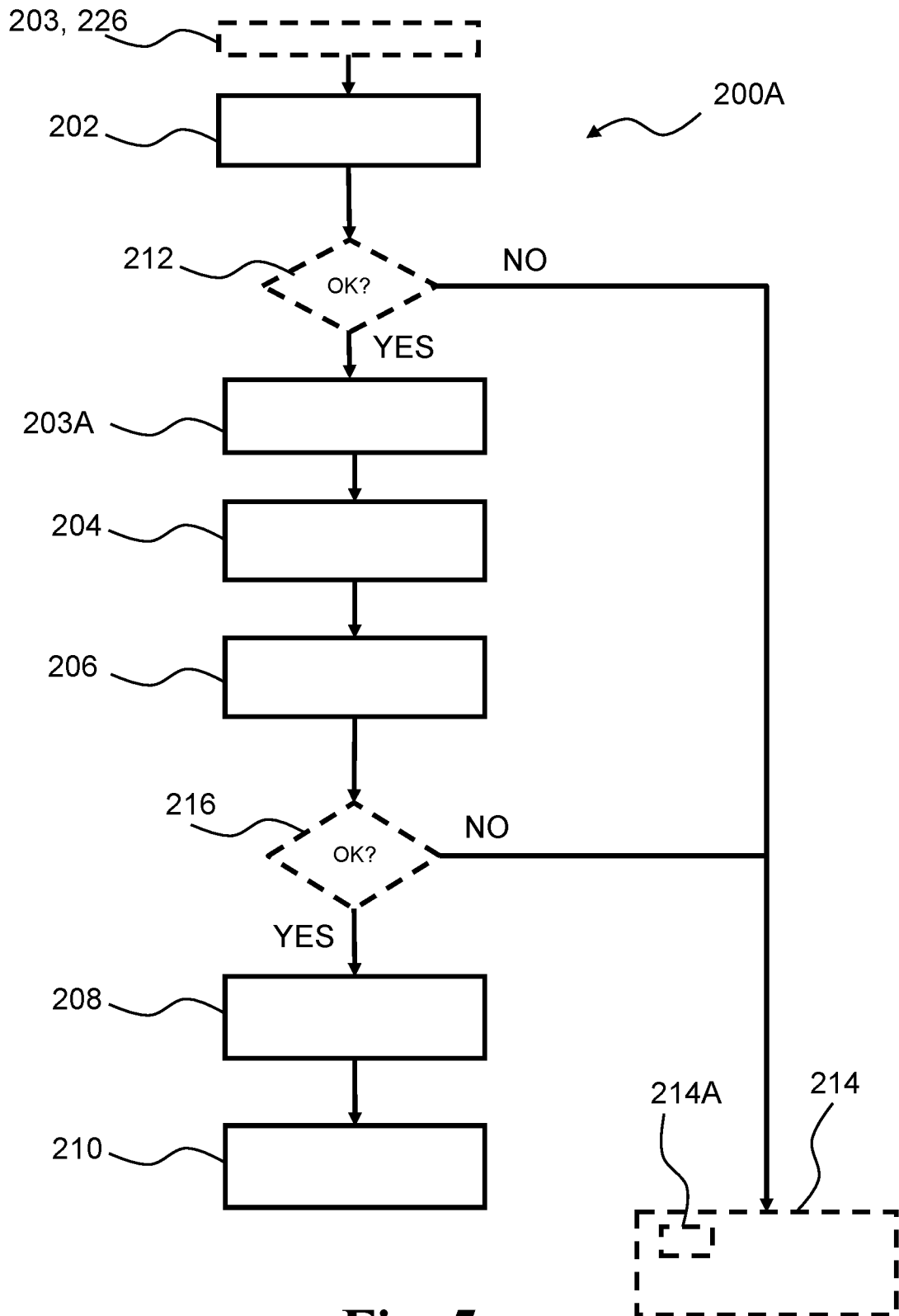
FIG. 5 is a flow diagram of an exemplary method.

FIG. 5 illustrates an exemplary method performed in a user application of creating a trusted bond between a hearing device and the user application. The method 200A comprises acts already described in connection with FIG. 4 using the same reference numerals. The method 200A optionally comprises verifying 212 the security data and/or the first authentication material, if not proceeding directly to 203A from 202. If the security data and/or the first authentication material are verified, the method 200A proceeds to 203A shown and described in more detail in FIG. 4 If verification 212 fails, the method 200A terminates 214, e.g. including providing 214A an error message in the user application.

The method 200A optionally comprises verifying 216 the authentication response, if not proceeding directly from 206 to 208. The acts of storing 208 authentication key and authentication key identifier and/or connecting 210 the user application to the hearing device using the authentication key and the authentication key identifier is performed if verifying the authentication response is successful. Verifying the authentication response is based on the first common secret and/the second common secret depending on authentication type.

Figure 6:
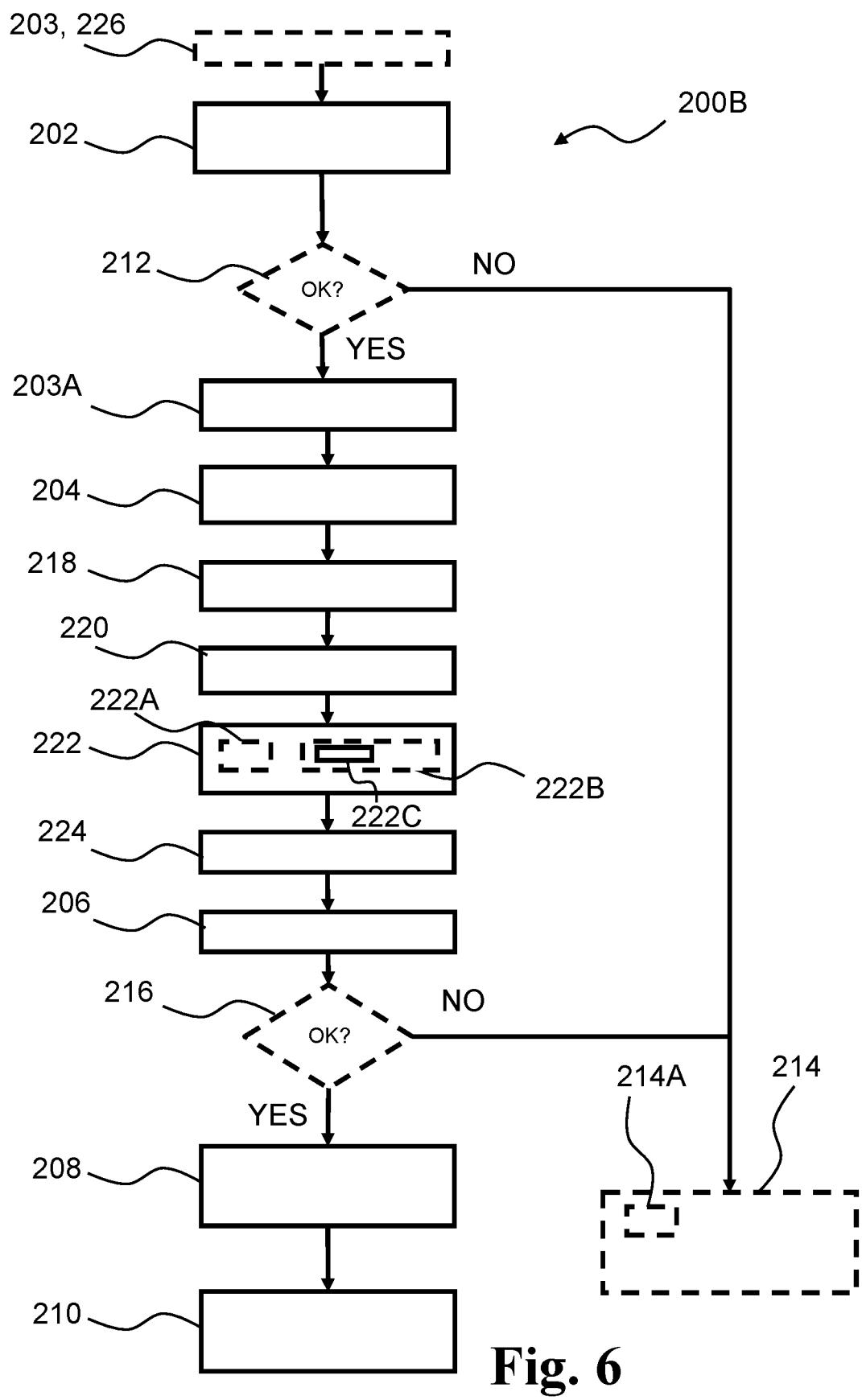
FIG. 6 is a flow diagram of an exemplary method.

FIG. 6 illustrates an exemplary method performed in a user application of creating a trusted bond between a hearing device and the user application. The security data obtained in 203 are indicative of a primary authentication type and the user application operates accordingly. Step 203A is the same as described in relation to method 200 of FIG. 4. The method 200B comprises receiving 218 an authentication accept message, e.g. authentication accept message 110. The authentication accept message is indicative of the hearing device having accepted the first authentication data/first authentication type identifier of the first authentication request, e.g. first authentication request 108. The method 200B proceeds to obtaining 220 second authentication material comprising a second hearing device challenge value and/or the hearing device identifier, and determining 222 second authentication data based on the second authentication material. Determining 222 second authentication data optionally comprises determining 222A a second common secret based on the second authentication material and optionally determining 222B the second authentication data based on the second common secret, e.g. as described in relation to FIG. 2. Determining 222 second authentication data optionally comprises determining 222C, e.g. as part of 222B, a secondary application session key, e.g. based on the second common secret, and optionally calculating the second authentication data based on the secondary application session key. The method 200B comprises transmitting 224 a second authentication request comprising a first authentication type identifier and the second authentication data to the hearing device, the first authentication type identifier being indicative of a second authentication request for the primary authentication type. In the method 200B, verifying 216 the authentication response is based on the second common secret.

Figure 7:
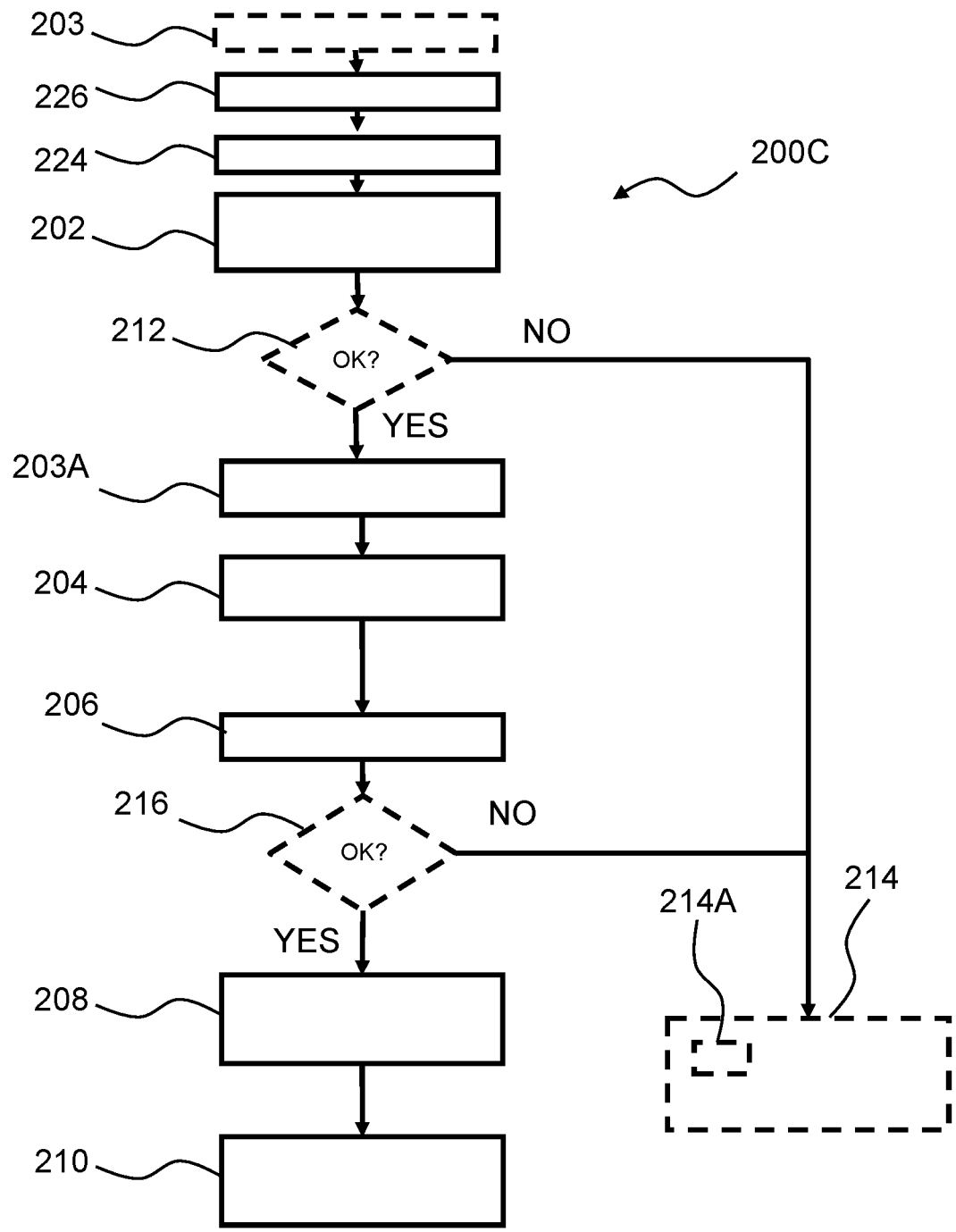
FIG. 7 is a flow diagram of an exemplary method.

FIG. 7 illustrates an exemplary method performed in a user application of creating a trusted bond between a hearing device and the user application. The security data obtained in 203 are indicative of a secondary authentication type and the user application operates accordingly. The method 200C comprises obtaining 224 a passcode from a user of the user application by receiving the passcode via a user interface of a user accessory device running the user application. Determining 203A is based on the passcode entered by the user, and determining 211 the authentication key (see FIG. 4) is based on the passcode. The method 200C comprises obtaining 226 a public key of the hearing device.

In step 203A of method 200C, the first authentication data AD_1 are given as:

$$AD\_1 = AES\_COUNTER(APP\_SK, APP\_S\_STRING),$$

wherein AES_COUNTER is encryption with AES in counter mode, APP_SK is the application session key and APP_S_STRING is a static string, and wherein the application session key APP_SK is given as:

$$APP\_SK = HASH(CS\_1, APP\_SK\_STRING),$$

wherein HASH is a hashing function, CS_1 is the first common secret and APP_SK_STRING is a static string.

The first common secret CS_1 is in exemplary method 200C given as:

$$CS\_1 = HASH(HASH(HASH(HD\_KEY, HD\_CHALLENGE\_1),$$
$$PASSCODE\_INFO), DH\_SECRET)$$

wherein HASH is a hashing function, HD_KEY is a hearing device key, e.g. based on the hearing device identifier, HD_CHALLENGE_1 is the first hearing device challenge value, PASSCODE_INFO is based on the passcode entered by the user, and DH_SECRET is the common secret of the Diffie-Hellman algorithm derived from the public keys of the hearing device and the user application. The passcode info PASSCODE_INFO is given as:

$$PASSCODE\_INFO = HASH(HD\_ID, PASSCODE\_STR),$$

wherein HASH is a hashing function, HD_ID is the hearing device identifier, and PASSCODE_STR is a string of characters with the passcode entered by the user. The hearing device key HD_KEY is given as:

$$HD\_KEY = HASH(HD\_ID, APP\_KEY),$$

wherein HASH is a hashing function, HD_ID is the hearing device identifier, and

APP_KEY is keying material stored in the user application. The hearing device key and the PASSCODE_STR/PASSCODE_INFO is also found or stored in the hearing device, thus enabling the hearing device to calculate the first common secret and verify the first authentication data.

Figure 8:
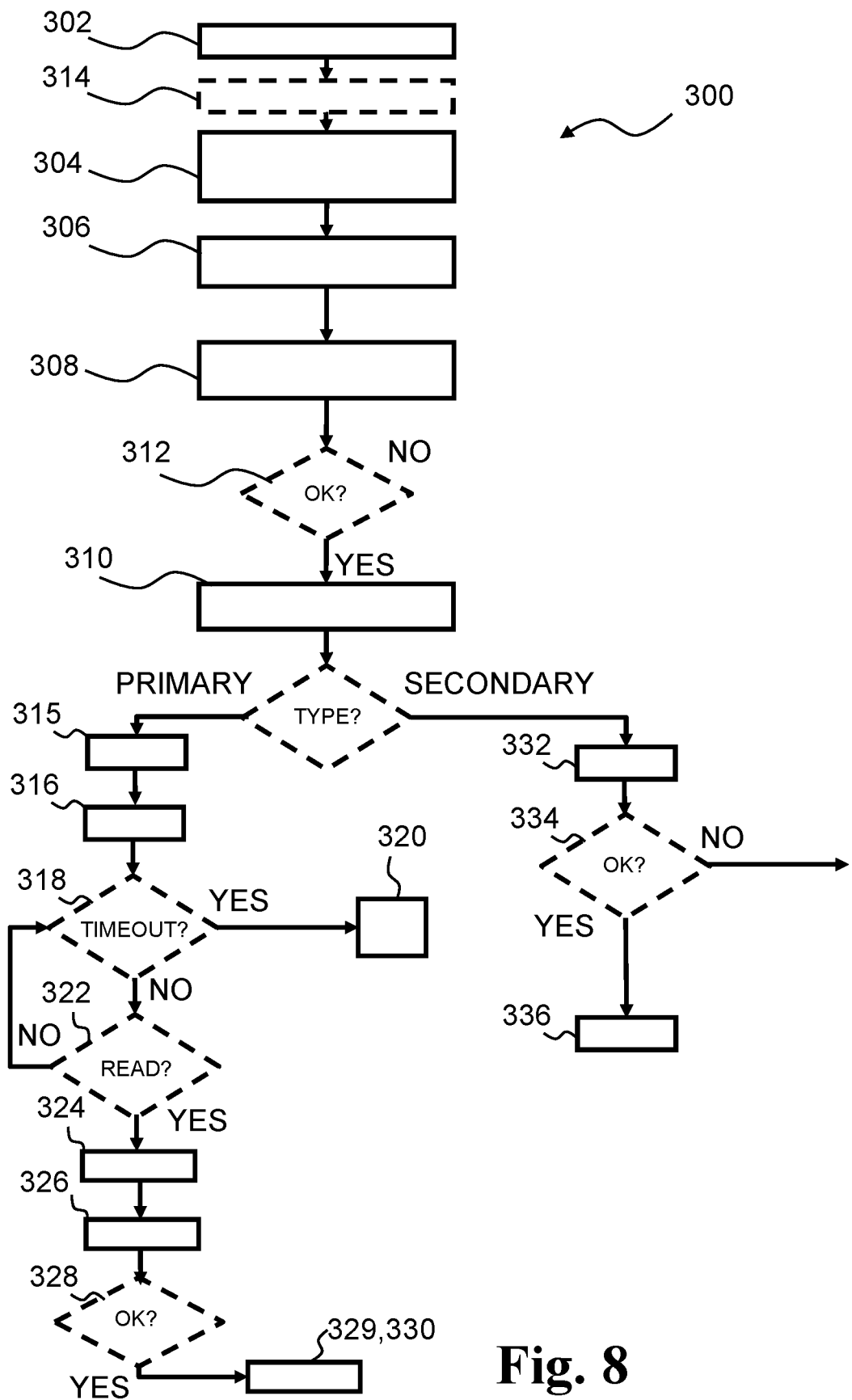
FIG. 8 is a flow diagram of an exemplary method, and FIG. 9 schematically illustrates an exemplary hearing device.

FIG. 8 illustrates an exemplary method performed in a hearing device of creating a trusted bond between the hearing device and a user application. The method 300 comprises transmitting 302, e.g. with transmit module 302a, security data of the hearing device, wherein the security data are indicative of an authentication type applied in the hearing device; transmitting 304, e.g. with transmit module 304a, first authentication material comprising a hearing device and first hearing device challenge value; receiving 306, e.g. with receive module 306a, a first authentication request comprising a first authentication type identifier and first authentication data; verifying 308, e.g. with verification module 308a, the first authentication data and/or first authentication type identifier; and determining and storing 310, e.g. with determine and store module 310a, an authentication key if verifying the first authentication data is successful 312. The method 300 optionally comprises transmitting 314 a public key of the hearing device to the user application. If the hearing device performs a primary authentication, the authentication key in step 310 is stored in a temporary memory and the method 300 proceeds to transmitting 315 an authentication accept message and starting 316 a timer. If the timer times out in 318, i.e. the timer reaches a timer threshold, the method proceeds to step 320 of deleting or overwriting the authentication key in the temporary memory and aborting the creation of a trusted bond between the hearing device and the user application. Otherwise, the method proceeds to determine 322 if a read message has been received. If read message has been received, the method 300 proceeds to transmitting 324 second authentication material comprising a second hearing device challenge value and receiving 326 a second authentication request comprising a second authentication type identifier and second authentication data. The method 300 comprises verifying 328 the second authentication data based on the authentication key stored in the temporary memory; and storing 329 the authentication key in authentication key storage with associated authentication key identifier and generating and transmitting 330 an authentication response comprising an authentication key identifier indicative of the authentication key in the hearing device, if verifying 328 the second authentication data is successful. Generating and transmitting an authentication response comprises determining hearing device authentication data, wherein the authentication response comprises the hearing device authentication data.

If the security data are indicative of a secondary authentication type, the method 300 proceeds to retrieving 332 a passcode from the memory unit of the hearing device and verifying 334 the first authentication data based on the passcode. If the first authentication data are not verified in 334, the method 300 aborts the creation of a trusted bond between the hearing device and the user application. Further, the method 300 comprises transmitting 336 an authentication response comprising an authentication key identifier indicative of the authentication key in the hearing device, if verifying the first authentication data is successful.

Figure 9:
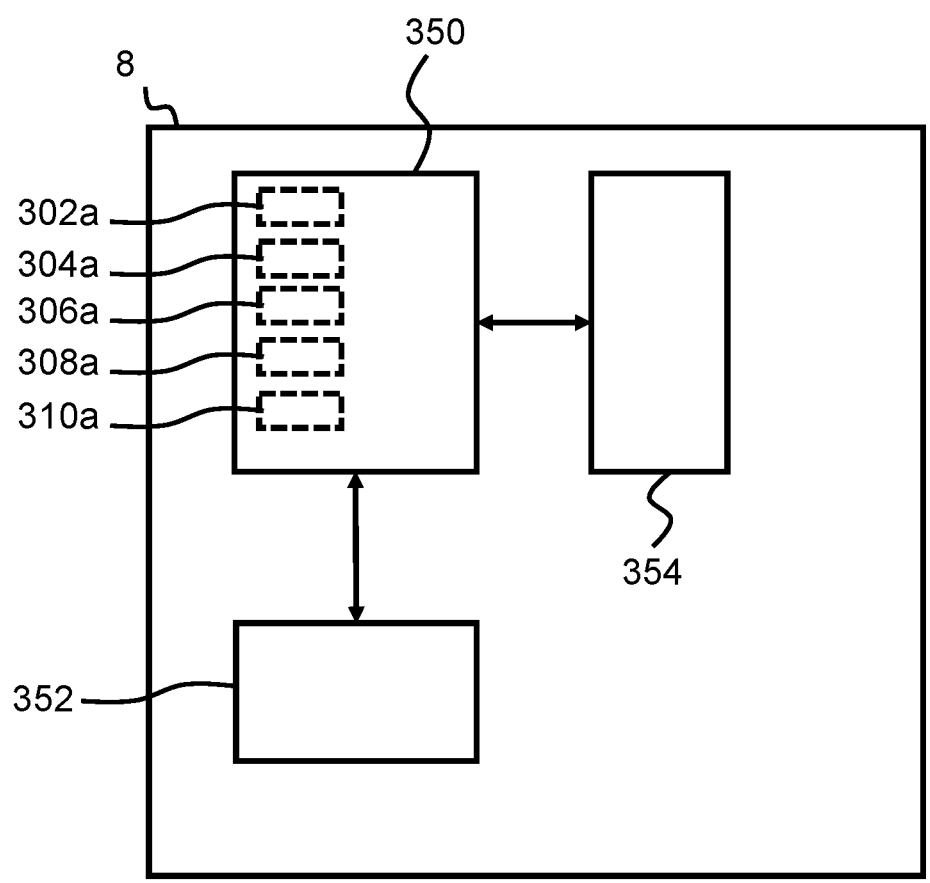

FIG. 9 shows an exemplary hearing device. The hearing device 8 comprises a processing unit 350 including a transmit module 302a, a transmit module 304a, a receive module 306a, a verification module 308a, and a determine and store module 310a. Further, the hearing device comprises a memory unit 352 and an interface 354, wherein the hearing device 8 is configured to transmit first authentication material, e.g. with transmit module 304a; receive a first authentication request comprising a first authentication type identifier and first authentication data, e.g. with receive module 306a; verify the first authentication data, e.g. with verification module 308a; and determine and store an authentication key, e.g. with determine and store module 310a, if verifying the first authentication data is successful.

The hearing device 8 may be arranged to execute at least parts of methods as disclosed herein. The processing unit 350 may further comprise a number of optional functional modules, such as any of a transmit module 302a configured to perform step 302, a transmit module 304a configured to perform step 304, a receive module 306a configured to perform step 306, verification module 308a configured to perform step 308, and determine and store module 310a configured to perform step 310. In general terms, each functional module may be implemented in hardware and/or in software.

The use of the terms "first", "second", "third" and "fourth", etc. does not imply any order, but are included to identify individual elements. Moreover, the use of the terms first, second, etc. does not denote any order or importance, but rather the terms first, second, etc. are used to distinguish one element from another. Note that the words first and second are used here and elsewhere for labelling purposes only and are not intended to denote any specific spatial or temporal ordering. Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2 hearing system
4 server device
6 hearing device system
8 hearing device
10 user accessory device
12 user application
20 first communication link
22 second communication link
24 antenna
26 radio transceiver
28 first microphone
30 second microphone
32 processing unit
34 receiver
36 processing unit
38 memory unit
40 interface
100, 100A signalling diagram
102 read message
104 first authentication data
106 read response message
107 key exchange signalling
108 first authentication request
110 authentication accept message
112 read message
114 second authentication material
116 read response message
118 second authentication request
120 authentication response
122 connection signalling 200, 200A, 200B method of creating a trusted bond between hearing device and user application
202 obtaining first authentication material
202a obtain module
203 obtain security data
203A determining first authentication data
203B determining a first common secret
203C determining the first authentication data based on the first common secret
203D determining an application session key and calculating the first authentication data based on the application session key
204 transmitting first authentication request
204a transmit module
206 receiving an authentication response
206a receive module
208 storing an authentication key and the authentication key identifier
208a storing module
210 connecting the user application to the hearing device
211 calculating the authentication key
212 verifying security data and/or first authentication material
214 terminating
214A providing error message
216 verifying the authentication response
218 receiving an authentication accept message
220 obtaining second authentication material
222 determining second authentication data
222A determining a second common secret based on the second authentication material
222B determining the second authentication data based on the second common secret
222C determining a secondary application session key and calculating the second authentication data based on the secondary application session key
224 obtain passcode
226 obtain public key of the hearing device
300 Method performed in a hearing device of creating a trusted bond between hearing device and user application
302 transmitting security data
302a transmit module
304 transmitting first authentication material
304a transmit module
306 receiving first authentication request
306a receive module
308 verifying the first authentication data and/or first authentication type identifier
308a verification module
310 determining and storing authentication key
310a determine and store module
312 verification ok?
314 transmitting public key of the hearing device
316 starting timer
318 timeout?
320 deleting or overwriting the authentication key in the temporary memory
322 read message received?
324 transmitting second authentication material
326 receiving a second authentication request
328 verifying the second authentication data
329 storing the authentication key in authentication key storage
330 generating and transmitting an authentication response
332 retrieving a passcode from the memory unit of the hearing device
334 verifying the first authentication data based on the passcode
336 transmitting an authentication response
350 processing unit
352 memory unit
354 interface

The invention claimed is:

1. A method of establishing a connection with a hearing device, comprising:
transmitting a first authentication request comprising first authentication data to the hearing device;
receiving an authentication response from the hearing device; and
establishing a connection with the hearing device after the authentication response is received, wherein the established connection provides a communication link for the hearing device, the hearing device configured to be worn at an ear of a user in a hands-free manner;
wherein the method further comprises:
receiving an authentication accept message before the connection is established;
obtaining second authentication information;
determining second authentication data based on the second authentication information; and
transmitting a second authentication request comprising the second authentication data to the hearing device.

2. The method according to claim 1, further comprising obtaining a hearing device identifier, wherein the connection is based on the hearing device identifier.

3. The method according to claim 1, further comprising obtaining a first authentication information, and determining a common secret based on the first authentication information, wherein the common secret is determined before the connection is established.

4. The method according to claim 1, further comprising determining a session key, wherein the first authentication data is based on the session key.

5. The method according to claim 1, further comprising verifying the authentication response;
wherein the act of establishing the connection with the hearing device is performed after the act of verifying the authentication response is performed.

6. The method according to claim 1, wherein authentication response comprises an authentication key identifier.

7. The method according to claim 1, further comprising obtaining security data from the hearing device.

8. The method according to claim 1, further comprising obtaining a passcode, and creating the first authentication request based on the passcode.

9. The method according to claim 1, further comprising obtaining a public key before the connection is established.

10. The method according to claim 1, wherein the first authentication data is based on a session information.

11. A method performed by a hearing device, comprising:
transmitting security data;
receiving a first authentication request comprising first authentication data;
verifying the first authentication data;
transmitting an authentication accept message;
receiving a second authentication request comprising second authentication data;
verifying the second authentication data; and transmitting an authentication response after the second authentication data is verified, the authentication response comprising a key identifier:
wherein the hearing device is configured to be worn at an ear of a user in a hands-free manner.

12. The method according to claim 11, further comprising:
starting a timer if the first authentication data is successfully verified; and
deleting or overwriting an authentication key after the timer reaches a timer threshold.

13. The method according to claim 11, further comprising:
obtaining a passcode;
wherein the verifying the first authentication data is performed based on the passcode.

14. The method according to claim 11, wherein the hearing device comprises a hearing aid.

15. The method according to claim 11, wherein the first authentication data is based on a session key.

16. The method according to claim 11, wherein the key identifier is indicative of an authentication key.

17. The method according to claim 16, wherein the authentication key is based on a public key.

18. A hearing device comprising:
a processing unit; and
a memory unit coupled to the processing unit;
wherein the processing unit of the hearing device is configured to:
receive a first authentication request comprising first authentication data;
verify the first authentication data;
receive a second authentication request comprising second authentication data after the first authentication request is received;
verify the second authentication data; and
transmit an authentication response comprising a key identifier after the second authentication data is verified.

19. The hearing device according to claim 18, wherein the first authentication data is based on a hearing device identifier identifying the hearing device that is configured to be worn at an ear of a user of the hearing device.

20. The hearing device according to claim 18, wherein the first authentication data is based on a session key.

21. The hearing device according to claim 18, wherein the hearing device comprises a hearing aid.

22. The hearing device according to claim 18, wherein the authentication key identifier is indicative of an authentication key.

23. The hearing device according to claim 22, wherein the authentication key is based on a public key.

* * * * *